(12) United States Patent
Tomoyori

(10) Patent No.: US 12,555,781 B2
(45) Date of Patent: *Feb. 17, 2026

(54) LITHIUM BATTERY AND METHOD FOR MANUFACTURING LITHIUM BATTERY

(71) Applicant: NASH ENERGY (I) PRIVATE LIMITED, Karnataka (IN)

(72) Inventor: Makoto Tomoyori, Aomori (JP)

(73) Assignee: NASH ENERGY(I) PRIVATE LIMITED, Bangalore (IN)

( * ) Notice: Subject to any disclaimer, the term of this patent is extended or adjusted under 35 U.S.C. 154(b) by 823 days.

This patent is subject to a terminal disclaimer.

(21) Appl. No.: 17/351,230

(22) Filed: Jun. 18, 2021

(65) Prior Publication Data

US 2021/0313565 A1 Oct. 7, 2021

Related U.S. Application Data

(63) Continuation of application No. PCT/JP2018/046793, filed on Dec. 19, 2018.

(51) Int. Cl.
*H01M 10/056* (2010.01)
*H01M 4/02* (2006.01)
(Continued)

(52) U.S. Cl.
CPC ......... *H01M 4/382* (2013.01); *H01M 10/056* (2013.01); *H01M 2004/027* (2013.01);
(Continued)

(58) Field of Classification Search
CPC .......................................... H01M 10/05–0587
See application file for complete search history.

(56) References Cited

U.S. PATENT DOCUMENTS

2007/0015060 A1* 1/2007 Klaassen ............. H01M 10/056
429/126
2009/0068563 A1 3/2009 Kanda et al.
(Continued)

FOREIGN PATENT DOCUMENTS

CN 101388470 A 3/2009
CN 101855772 A 10/2010
(Continued)

OTHER PUBLICATIONS

Espacenet machine translation of CN-107195969-A (Year: 2017).*
(Continued)

*Primary Examiner* — Jonathan G Leong
(74) *Attorney, Agent, or Firm* — HAUPTMAN HAM, LLP

(57) ABSTRACT

The purpose of the present invention is to efficiently manufacture a lithium battery having improved conductivity. Provided is a lithium battery including a substrate; a positive electrode material layer formed on one surface of the substrate; an electrolyte layer formed on the surface of the positive electrode material layer opposite to the surface facing the substrate; a buffer layer formed on the surface of the electrolyte layer opposite to the surface facing the substrate; a negative electrode layer containing lithium, which is formed on the surface of the buffer layer opposite to the surface facing the substrate. The electrolyte layer has a recessed part that is recessed toward the substrate in a portion of the surface facing the negative electrode layer, and the buffer layer is formed such that the buffer layer fills the recessed part.

5 Claims, 6 Drawing Sheets

(51) Int. Cl.
*H01M 4/38* (2006.01)
*H01M 10/0585* (2010.01)
*H01M 10/0525* (2010.01)
*H01M 10/0565* (2010.01)

(52) U.S. Cl.
CPC .. *H01M 2004/028* (2013.01); *H01M 10/0525* (2013.01); *H01M 10/0565* (2013.01); *H01M 10/0585* (2013.01)

(56) References Cited

U.S. PATENT DOCUMENTS

| | | |
|---|---|---|
| 2010/0273056 A1 | 10/2010 | Kanda et al. |
| 2011/0045168 A1* | 2/2011 | Seo ............... H01M 50/497 427/58 |
| 2012/0328959 A1* | 12/2012 | Hayashi ............ H01M 4/382 429/319 |
| 2013/0164571 A1 | 6/2013 | Hirose |
| 2014/0199598 A1* | 7/2014 | Hoshina ........... H01M 10/0525 429/322 |
| 2015/0111110 A1 | 4/2015 | Watanabe et al. |
| 2016/0351950 A1 | 12/2016 | Ohuchi et al. |
| 2017/0358825 A1* | 12/2017 | Yoshima ........... H01M 10/0585 |

FOREIGN PATENT DOCUMENTS

| | | | | |
|---|---|---|---|---|
| CN | 103081215 A | | 5/2013 | |
| CN | 104272518 A | | 1/2015 | |
| CN | 106207162 A | | 12/2016 | |
| CN | 107195969 A | * | 9/2017 | .......... H01M 10/052 |
| CN | 110265715 A | * | 9/2019 | ........ H01M 10/0565 |
| JP | 2001229967 A | | 8/2001 | |
| JP | 2008171588 A | | 7/2008 | |
| JP | 2009301726 A | | 12/2009 | |
| JP | 2010033782 A | | 2/2010 | |
| JP | 2011129316 A | | 6/2011 | |
| JP | 201345738 A | | 3/2013 | |
| JP | 201528846 A | | 2/2015 | |
| JP | 2017054792 A | | 3/2017 | |
| KR | 1020180036410 A | | 4/2018 | |

OTHER PUBLICATIONS

Espacenet machine translation of CN-110265715-A (Year: 2019).*
Shen et al., Recent progress on in-situ observation and growth mechanism of lithium metal dendrites, Energy Storage Science and Technology, May 2017, pp. 418-432, vol. 6, No. 3, 27pp.

* cited by examiner

LITHIUM BATTERY AND METHOD FOR MANUFACTURING LITHIUM BATTERY

CROSS-REFERENCE TO RELATED APPLICATIONS

The present application is a continuation application of International Application number PCT/JP2018/046793, filed on Dec. 19, 2018. The contents of this application are incorporated herein by reference in their entirety.

BACKGROUND

Conventionally, a lithium secondary battery using metallic lithium in an electrode plate for a negative electrode is known. Further, Patent Document 1, Japanese Unexamined Patent Application Publication No. 2009-301726, discloses that such a lithium battery can be manufactured using a solid electrolyte membrane containing a Lithium Super Ionic Conductor (LISICON).

Conventionally, a flammable electrolytic solution containing a non-aqueous organic solvent has been used for a lithium-ion secondary battery. Therefore, such a lithium-ion secondary battery has a problem that there is a risk of electrolyte leakage and a possibility of an ignition accident. Further, it has been known to use a polymer electrolyte capable of reducing the electrolyte leakage instead of an electrolytic solution. Such a polymer electrolyte cannot control combustibility at a high temperature of about 200° C., and has poor conductivity of lithium ions, for example. Therefore, there is a demand to realize a lithium battery using a solid electrolyte layer to reduce electrolyte leakage and control ignitability. However, the interface resistance between an electrolyte layer and a negative electrode material tends to increase in a lithium battery using such a solid electrolyte layer, causing a decrease in conductivity.

SUMMARY

The present invention has been made in view of these points, and an object thereof is to efficiently manufacture a lithium battery improved in conductivity.

The first aspect of the present invention provides a lithium battery includes a substrate, a positive electrode material layer formed on one surface of the substrate, an electrolyte layer formed on the surface of the positive electrode material layer opposite to the surface facing the substrate, a buffer layer formed on the surface of the electrolyte layer opposite to the surface facing the substrate, and a negative electrode layer that contains lithium and is formed on the surface of the buffer layer opposite to the surface facing the substrate, wherein the electrolyte layer has a recessed part that is recessed toward the substrate in a portion of the surface facing the negative electrode layer, and the buffer layer is formed in such a manner that the buffer layer fills the recessed part.

The second aspect of the present invention provides a method for manufacturing a lithium battery includes the steps of forming a positive electrode material layer by applying a positive electrode material to one surface of a substrate and then drying and baking the positive electrode material, forming an electrolyte layer by applying an electrolyte to the surface of the positive electrode material layer opposite to the surface facing the substrate and then drying and baking the electrolyte, forming a buffer layer by applying a buffer material to at least a portion of the surface of the electrolyte layer opposite to the surface facing the substrate, and forming a negative electrode layer by laminating a negative electrode material containing lithium on the surface of the buffer layer opposite to the surface facing the substrate, wherein the forming the electrolyte layer further includes a step of forming a recessed part such that the recessed part is recessed toward the substrate on a portion of the surface of the electrolyte opposite to the surface facing the substrate, after drying the electrolyte, wherein the forming the buffer layer includes forming the buffer layer by applying a buffer material to the recessed part of the electrolyte layer.

DETAILED DESCRIPTION OF THE INVENTION

Hereinafter, the present invention will be described through exemplary embodiments of the present invention, but the following exemplary embodiments do not limit the invention according to the claims, and not all of the combinations of features described in the exemplary embodiments are necessarily essential to the solution means of the invention.

Example of Schematic Configuration of the Lithium Battery 10

Figure 1:
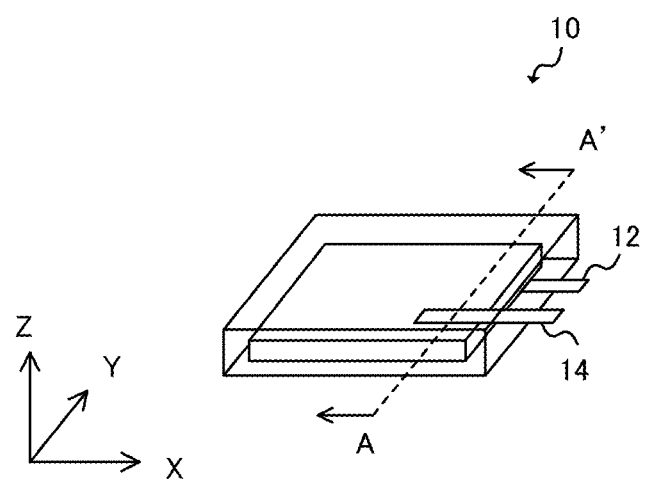
FIG. 1 shows a configuration example of a lithium battery 10 according to the present embodiment.

FIG. 1 shows a configuration example of a lithium battery 10 according to the present embodiment. In FIG. 1, the three mutually orthogonal axes are the X axis, Y axis, and Z axis. The lithium battery 10 according to the present embodiment is a secondary battery in which at least metallic lithium is used as a negative electrode material. The lithium battery 10 is charged by accumulating charges internally, and includes a positive electrode terminal 12 and a negative electrode terminal 14 for discharging by releasing accumulated charges to the outside.

It should be noted that such a secondary battery using lithium as a material of a negative electrode is conventionally referred to as "a lithium battery" rather than "a lithium-ion battery" in the present embodiment. However, the technical scope of the present invention is not limited to a secondary battery referred to as a lithium battery, and it is needless to say that a secondary battery ranges to batteries of other representations as long as it is a secondary battery in which at least lithium is used as a negative electrode material.

Conventionally, since the lithium battery 10 was manufactured by laminating an electrode plate of metallic lithium on the upper surface of the electrolyte layer, the interface resistance between the electrolyte layer and the negative electrode material tended to increase. Ideally, it is conceivable to form the lithium battery 10 by vacuum-depositing metallic lithium on the upper surface of the electrolyte layer and bringing the electrolyte layer and the negative electrode material into close contact. However, vacuum deposition of metallic lithium leads to low production efficiency, and in addition, using a vacuum device may be time-consuming and costly in manufacturing. Therefore, the lithium battery 10 according to the present embodiment, which can be manufactured by a simple method without vacuum deposition or the like, can reduce the interface resistance between the electrolyte layer and the negative electrode material, and has improved conductivity, will be described.

Configuration Example of a Cross Section of the Lithium Battery 10

Figure 2:
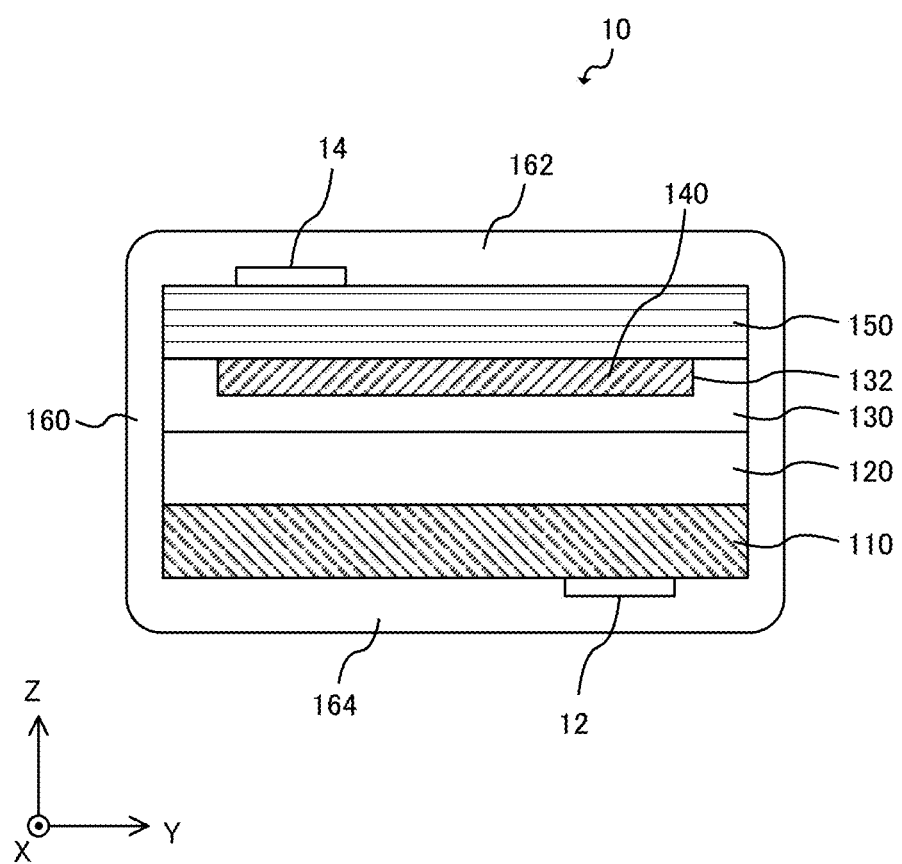
FIG. 2 shows an example of a cross-sectional configuration of the lithium battery 10 according to the present embodiment.

FIG. 2 shows an example of a cross-sectional configuration of the lithium battery 10 according to the present embodiment. FIG. 2 shows a configuration example of a cross section of the lithium battery 10 along the A-A' line shown in FIG. 1. The lithium battery 10 includes a positive electrode terminal 12 and a negative electrode terminal 14, a substrate 110, a positive electrode material layer 120, an electrolyte layer 130, a buffer layer 140, a negative electrode layer 150, and a sealing material 160.

The substrate 110 is an electrode plate having conductivity. The substrate 110 is a metal electrode plate, for example. The substrate 110 is a stainless-steel substrate, an alumina substrate, or the like containing iron and chromium or the like, for example. The positive electrode terminal 12 is electrically connected to the substrate 110. The positive electrode terminal 12 includes a metal such as copper, for example. FIG. 1 shows an example in which the substrate 110 is arranged substantially parallel to the XY plane. Further, FIG. 1 shows an example in which the positive electrode material layer 120, the electrolyte layer 130, the buffer layer 140, and the negative electrode layer 150 are laminated in a +Z direction on one surface of the substrate 110.

The positive electrode material layer 120 is formed on one surface of the substrate 110. The positive electrode material layer 120 may include any of $LiMn_2O_4$, $LiCoO_2$, $LiFePO_4$, and $LiPO_4$, for example, as a positive electrode active material. Also, the positive electrode material layer 120 is formed using a Metal Polymer Solution (MPS) containing a positive electrode active material or the like as a binder.

Further, the positive electrode material layer 120 contains LAGP such as $Li_{1+x}Al_xGe_{2-x}(PO_4)_3$ that is finely grained to a size of 5 μm or less. The positive electrode material layer 120 may alternatively contain a LISICON that is finely grained to a size of 5 μm or less. The positive electrode material layer 120 is an inorganic solid electrolyte layer that is formed using a positive electrode material, which is slurried by mixing finely-grained LAGP or LISICON and an MPS containing a positive electrode active material, for example.

The electrolyte layer 130 is formed on the surface of the positive electrode material layer 120 opposite to the surface facing the substrate 110. The electrolyte layer 130 has, as an active material, LAGP that is finely grained, for example. Also, the electrolyte layer 130 is formed using an MPS containing such an active material as a binder. Further, the electrolyte layer 130 may have a LISICON that is finely grained to a size of 5 μm or less in a similar manner as the positive electrode material layer 120. The electrolyte layer 130 is an inorganic solid electrolyte layer that is formed using an electrolyte, which is slurried by mixing a finely-grained LISICON and an MPS containing an active material, for example.

The buffer layer 140 is formed on the surface of the electrolyte layer 130 opposite to the surface facing the substrate 110. The buffer layer 140 includes at least an electrolytic solution or an ionic liquid, for example. Further, an alumina aerogel may be added to the buffer layer 140 to increase viscosity and operability. The alumina aerogel may be a thickener, and powdered aluminum oxide is mixed therein, as an example.

It is desirable that at least a portion of the buffer layer 140 is formed on a processed region of the surface of the electrolyte layer 130. The electrolyte layer 130 includes a recessed part 132 that is recessed toward the substrate 110 in a portion of the surface facing the negative electrode layer 150, for example. It is desirable that the recessed part 132 is formed on a region excluding edges of the electrolyte layer 130. The recessed part 132 has a bathtub shape, as an example. A plurality of recessed parts 132 may be provided in the electrolyte layer 130. Thus, the recessed part 132 can prevent the gel-like buffer layer 140 from flowing out of the edges of the electrolyte layer 130 in the manufacturing process of the lithium battery 10. Also, the buffer layer 140 is formed in such a manner that the buffer layer 140 fills such a recessed part 132.

The negative electrode layer 150 is formed on the surface of the buffer layer 140 opposite to the surface facing the substrate 110, and includes lithium. The negative electrode layer 150 is an electrode plate having conductivity. The negative electrode layer 150 is a substrate on which a copper foil and a lithium foil are laminated, for example. The negative electrode terminal 14 is electrically connected to the negative electrode layer 150. The negative electrode terminal 14 includes a metal such as copper, for example. FIG. 1 shows an example in which the negative electrode layer 150 is arranged substantially parallel to the substrate 110.

The sealing material 160 is provided in such a manner that the sealing material 160 covers the substrate 110, the positive electrode material layer 120, the electrolyte layer 130, the buffer layer 140, and the negative electrode layer 150, and covers the inside of the lithium battery 10. The sealing material 160 exposes a portion of the positive electrode terminal 12 and the negative electrode terminal 14 for electrifying the inside of the lithium battery 10. The sealing material 160 is preferably provided in such a manner that the sealing material 160 is in close contact with at least the substrate 110 and the negative electrode layer 150.

The sealing material 160 is provided in such a manner that the sealing material 160 seals the substrate 110, the positive electrode material layer 120, the electrolyte layer 130, the buffer layer 140, and the negative electrode layer 150. The sealing material 160 includes a first sealing material 162 on the negative electrode layer 150 side and a second sealing material 164 on the substrate 110 side, for example. The first sealing material 162 and the second sealing material 164 are a single piece of material, for example. The sealing material 160 is folded at the folding line to be divided into a first sealing material 162 and a second sealing material 164, for example. In this case, the corresponding ends of the first sealing material 162 and the second sealing material 164 overlap with each other, and at least the ends are caused to be in close contact with each other by a vacuum sealer or the like to form the sealing material 160 sealing the inside.

The first sealing material 162 is in close contact with the surface of the negative electrode layer 150 facing the opposite side of the substrate 110. Further, the second sealing material 164 is in close contact with the surface of the substrate 110 facing the opposite side of the positive electrode material layer 120. Furthermore, the first sealing material 162 and the second sealing material 164 are larger than any of the members of the substrate 110, the positive electrode material layer 120, the electrolyte layer 130, the buffer layer 140, and the negative electrode layer 150 in the XY plane, and are in close contact with the periphery of the members of the substrate 110, the positive electrode material layer 120, the electrolyte layer 130, and the negative electrode layer 150 to seal these members. Thus, the sealing material 160 can prevent the gel-like material of the buffer layer 140 from seeping out to the outside.

As described above, the electrolyte layer 130 and the negative electrode layer 150 are formed, sandwiching the buffer layer 140 therebetween in the lithium battery 10 according to the present embodiment. Therefore, interface resistance can be reduced with better adhesion between the electrolyte layer 130 and the negative electrode layer 150, compared to a conventional configuration example in which the negative electrode layer 150 is laminated on the surface of the electrolyte layer 130. Further, the lithium battery 10 can be manufactured by laminating the negative electrode layer 150 and the buffer layer 140 without vacuum-depositing metallic lithium. Therefore, such a lithium battery 10 with improved conductivity can be manufactured inexpensively and more efficiently. A process for manufacturing the above-described lithium battery 10 will be described below.

<Manufacturing Flow of the Lithium Battery 10>

Figure 3:
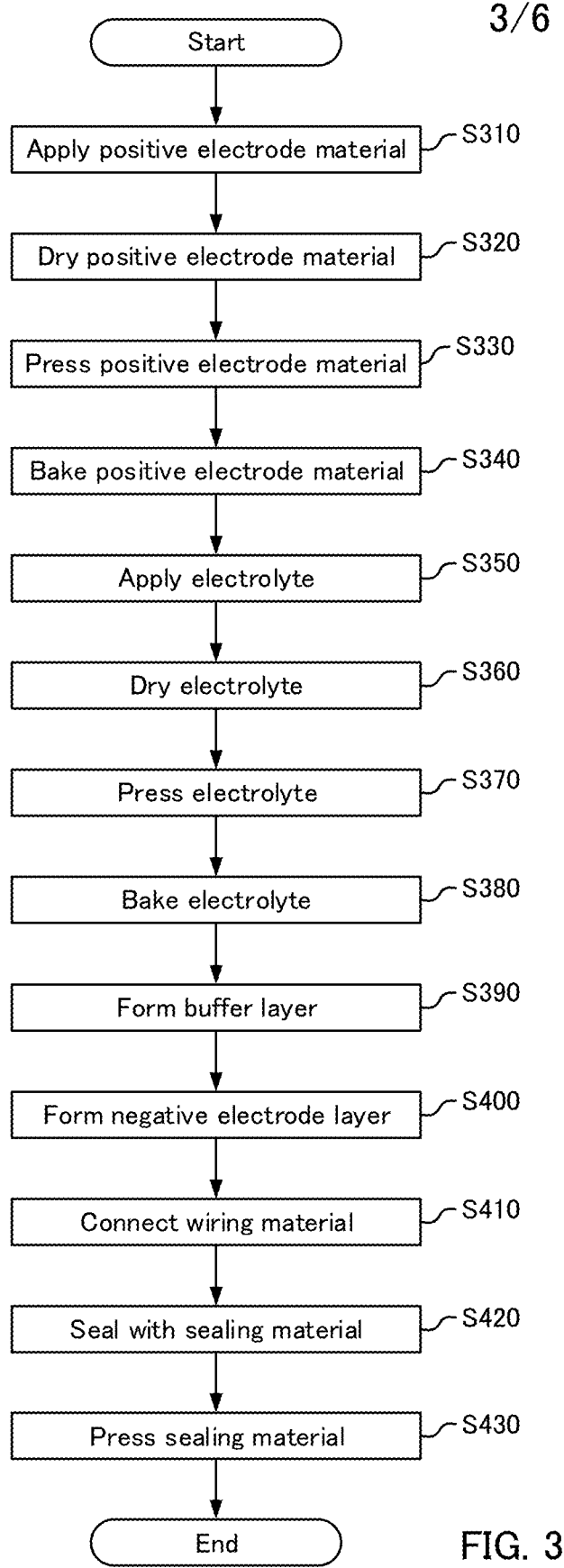
FIG. 3 is a flowchart illustrating an example of manufacturing the lithium battery 10 according to the present embodiment.

FIG. 3 shows an example of the manufacturing flow of the lithium battery 10 according to the present embodiment. First, a positive electrode material is applied to one surface of the substrate 110 (S310). The positive electrode material is a raw electrolyte material for a positive electrode, which is made by adding an MPS solution containing a positive electrode active material to LAGP that is finely grained to a size of 5 µm or less and stirring, for example. It should be noted that the LISICON that is finely grained to a size of 5 µm or less may be used instead of LAGP. The positive electrode material is agitated and slurried by a stirring and dispersing device, a spatula, a stirrer, an ultrasonic vibrator, or the like, for example. Further, the positive electrode material is applied by an application device, for example.

The LAGP or LISICON may have diameters of 5 µm or less, and the diameters range from about 0.1 µm to 5 µm, for example. The sizes of the LAGP or LISICON preferably range from about 0.3 µm to 4 µm, and more preferably range from about 0.5 µm to 3 µm.

When the positive electrode active material is $LiMn_2O_4$, an MPS containing a positive electrode active material is formed by dissolving organic lithium and organic manganese, for example, in a polyvinyl acetate polymer using propylene glycol monomethyl ether as a solvent. Further, when the positive electrode active material is $LiCoO_2$, an MPS containing a positive electrode active material is formed by dissolving organic lithium and organic cobalt, for example, in a polyvinyl acetate polymer using propylene glycol monomethyl ether as a solvent.

Next, the applied positive electrode material is dried (S320). The positive electrode material is exposed to the environment with the temperature of approximately 100° C. or higher, for example. The positive electrode material is dried by keeping the substrate 110 applied with the positive electrode material in the environment of about 125° C. for about 30 minutes, as an example.

Next, the positive electrode material after drying is pressed at a predetermined pressure (S330). In this case, the substrate 110 after drying the positive electrode material is pressed using a roller press, a plane heat press, or the like, for example. Thus, when a hole or the like is generated inside the positive electrode material, the hole or the like can be eliminated or reduced.

Next, the dried positive electrode material is baked (S340). The positive electrode material is exposed to an environment with a temperature of approximately 500° C. or higher by a baking furnace or the like, for example. The positive electrode material is baked by keeping the substrate 110 that has the positive electrode material applied thereto and dried in an environment of about 600° C. for about 60 minutes, as an example. As described above, the positive electrode material is applied to one surface of the substrate 110 and then dried, and baked to form the positive electrode material layer 120.

Next, an electrolyte is applied to the exposed surface of the positive electrode material layer 120 (S350). The electrolyte is a raw electrolyte material, which is made by adding LAGP that is finely grained to a size of 5 µm or less to an MPS solution and stirring, for example. It should be noted that a LISICON that is finely grained to a size of 5 µm or less may be used instead of LAGP. The electrolyte is dispersed using a self-rotating/revolving stirring and dispersing device with centrifugal force, for example, in a similar manner as the positive electrode material to make a coating slurry. Immediately before application, the electrolyte is further stirred and dispersed again by a spatula, a stirrer, an ultrasonic vibrator, or the like, and is applied by an application device, for example, in a similar manner as the positive electrode material.

Figure 4:
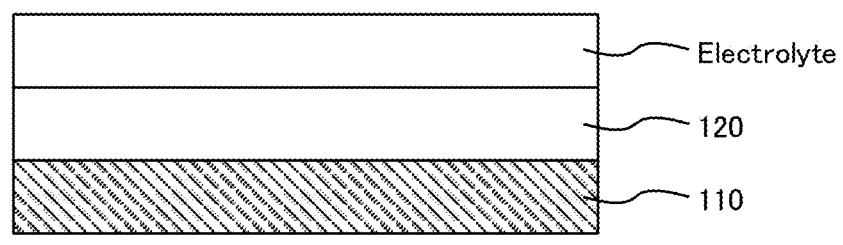
FIG. 4 shows an example of a cross-sectional structure in a phase where an electrolyte is applied and dried after forming a positive electrode material layer 120 on a substrate 110 according to the present embodiment.
Figure 4:
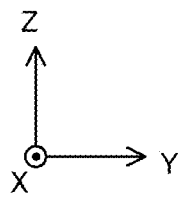

Next, the applied electrolyte is dried (S360). The electrolyte is exposed to an environment with a temperature of approximately 100° C. or higher, for example. The electrolyte is dried under the same conditions as the positive electrode material, as an example. FIG. 4 shows an example of a cross-sectional structure in a phase where the electrolyte is applied and dried after forming the positive electrode material layer 120 on the substrate 110 according to the present embodiment.

Next, the electrolyte after drying is pressed at a predetermined pressure (S370). Thus, when a hole or the like is generated inside the positive the electrolyte, the hole or the like can be eliminated or reduced. Here, the recessed part 132 may be formed by pressing the electrolyte. In this case, after drying the electrolyte, a portion of the surface of the electrolyte opposite to the surface facing the substrate 110 is pressed to form the recessed part 132 in such a manner that the recessed part 132 is recessed toward the substrate 110. Thus, the recessed part 132 having a predetermined shape can be formed in the electrolyte after drying, reducing the holes of the electrolyte.

A roller press, a plane heat press, or the like is used for pressing the electrolyte. It should be noted that since the electrolyte is formed on top of the already baked positive electrode material layer 120, cracks or the like might be generated on the positive electrode material layer 120 when the electrolyte is pressed by a roller press. Therefore, it is preferable to use a plane heat press for pressing the electrolyte.

Figure 5:
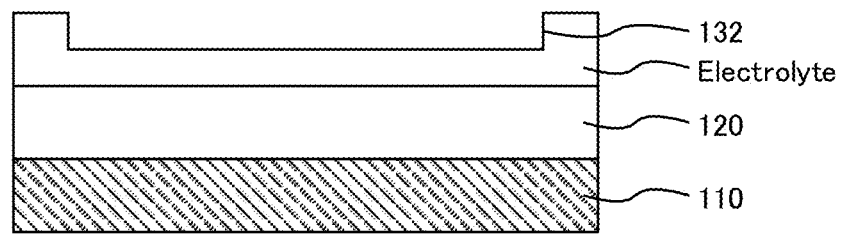
FIG. 5 shows an example of a cross-sectional structure in a phase where a recessed part 132 is formed on the substrate 110 according to the present embodiment.
Figure 5:
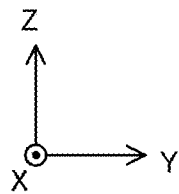

Here, it is assumed that the positive electrode material layer 120 and the electrolyte are formed on one surface of the substrate 110 in a square shape of 50 mm×50 mm in the XY plane, as an example. In this case, the recessed part 132 is formed by pressing a square region of 40 mm×40 mm, for example, of the 50 mm×50 mm surface of the exposed electrolyte. FIG. 5 shows an example of a cross-sectional structure in a phase where the recessed part 132 is formed on the substrate 110 according to the present embodiment.

Here, a plurality of the recessed parts 132 may be formed. The recessed part 132 may be provided by being divided into a plurality of parts so that the interface of the buffer layer 140 may be a smooth surface, for example. Further, it is possible to reduce the possibility of contact failure and other problems in a pressing step by forming a smooth interface by providing a plurality of the recessed parts 132 as described above. Furthermore, providing a plurality of the recessed parts 132 prevents energization failure, since at least a portion of the buffer layer 140 filling the plurality of recessed parts 132 is in contact with the negative electrode material.

Next, the electrolyte on which the recessed part 132 is formed is baked (S380). The electrolyte is exposed to the environment with the temperature of approximately 500° C. or higher by a baking furnace or the like in a similar manner as the positive electrode material, for example. The electrolyte is baked by keeping the substrate 110 having the electrolyte on which the recessed part 132 is formed in an environment of approximately 600° C. for about 60 minutes, as an example. As described above, the electrolyte is applied to the surface of the positive electrode material layer 120 opposite to the substrate 110, and then dried and baked to form the electrolyte layer 130. Such baking of the electrolyte stabilizes the recessed part 132.

Next, a buffer material is applied to at least a portion of the surface of the electrolyte layer 130 opposite to the surface facing the substrate 110 to form the buffer layer 140 (S390). The buffer material includes a gel-like material in which an alumina aerogel is added to an electrolytic solution or an ionic liquid, for example. The alumina aerogel includes $Al_2O_3$, for example. The buffer layer 140 is formed by applying such a buffer material to the recessed part 132 of the electrolyte layer 130. The application of the buffer material is preferably performed in an atmosphere that is not exposed to oxygen, such as in a glove box in an argon gas, for example.

Figure 6:
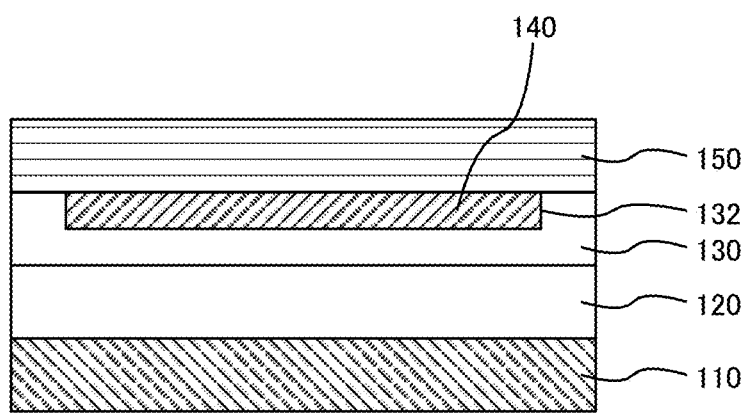
FIG. 6 shows an example of a cross-sectional structure in a phase where an internal configuration of the lithium battery 10 according to the present embodiment is formed.
Figure 6:
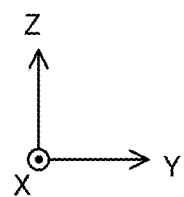

Next, the negative electrode layer 150 is formed by laminating a negative electrode material containing lithium on the surface of the buffer layer 140 opposite to the surface facing the substrate 110 (S400). The negative electrode material is a substrate on which a copper foil and a lithium foil are laminated, for example. The negative electrode material is preferably laminated on the buffer layer 140 in a glove box in an argon gas atmosphere, for example. The negative electrode material has a square shape of 50 mm×50 mm in the XY plane, and the internal configuration of the lithium battery 10 having a shape of approximately 50 mm×50 mm is formed, as an example. FIG. 6 shows an example of a cross-sectional structure in a phase where the internal configuration of the lithium battery 10 according to the present embodiment is formed.

Next, a wiring material is connected to each of the substrate 110 and the negative electrode layer 150 (S410). The wiring material is the positive electrode terminal 12 and the negative electrode terminal 14. That is, the positive electrode terminal 12 is fixed to the substrate 110, and the negative electrode terminal 14 is fixed to the negative electrode layer 150. The positive electrode terminal 12 and the negative electrode terminal 14 are fixed respectively with a polyimide tape or the like, for example. In a case of a negative electrode material of lithium metal, it is preferable that the positive electrode terminal 12 and the negative electrode terminal 14 are fixed respectively in a glove box in an argon gas atmosphere, for example.

Next, materials other than a portion of the wiring material are sealed with a sealing material (S420). The sealing material is the sealing material 160. The sealing material 160 covers the substrate 110, the positive electrode material layer 120, the electrolyte layer 130, the buffer layer 140, and the negative electrode layer 150, and seals them in such a manner that the sealing material 160 exposes portions of the positive electrode terminal 12 and the negative electrode terminal 14 to the outside. The sealing material 160 seals the internal structure of the lithium battery 10 by sealing using a vacuum sealer or the like, for example. It should be noted that sealing may be performed with the sealing material 160 after arranging an aluminum foil or the like on the other surface of the substrate 110 and the surface of the negative electrode layer 150 opposite to the substrate 110.

Next, the sealing material in a state where the internal structure of the lithium battery 10 is sealed is pressed (S430). The sealing material 160, which is the sealing material, is pressed by a heating roller or the like, for example. Accordingly, it is possible to prevent the gel-like material of the buffer layer 140 from seeping out to the outside since the sealing material 160 and the internal structure of the lithium battery 10 are in close contact with each other. The pressing of the sealing material 160 is preferably performed in a reduced-pressure atmosphere where the atmospheric pressure is lower than standard atmospheric pressure, for example. The steps from the application of the buffer material (S390) to the pressing of the sealing material (S430) may be performed in a glove box in an argon gas atmosphere, as an example. FIGS. 1 and 2 show a configuration example in a phase where the sealing material 160 is pressed, that is, an example of the result of manufacturing the lithium battery 10 according to the present embodiment.

The lithium battery 10 according to the present embodiment can be easily manufactured by using a simple facility such as a glove box or the like, for example, since the lithium battery 10 can be manufactured without vacuum deposition or the like. Therefore, the lithium battery 10 having improved conductivity by providing the buffer layer 140 can be manufactured inexpensively and more efficiently. It should be noted that an example of manufacturing a single lithium battery 10 has been described in the present embodiment, but the present invention is not limited thereto. A plurality of portions of the lithium battery 10 may be formed together by forming the positive electrode material layer 120, the electrolyte layer 130, the buffer layer 140, and the negative electrode layer 150 on the substrate 110 extending in one direction, for example. In this case, after cutting members that have been formed together, a plurality of lithium batteries 10 can be manufactured by executing the flow after the step of connecting the wiring material of S400 for each cut member.

In the lithium battery 10 according to the present embodiment described above, an example of forming the recessed part 132 filled with the buffer material by pressing the electrolyte layer 130 has been described, but the present invention is not limited thereto. The recessed part 132 may be formed by processing the electrolyte layer 130 by performing etching or the like, for example. Further, the recessed part 132 may be formed by selectively laminating at least a portion of the electrolyte layer 130 by photolithography or the like.

Further, in the lithium battery 10 according to the present embodiment, an example of forming the recessed part 132 on a portion of the electrolyte layer 130 and forming the buffer layer 140 on the recessed part 132 has been described. In this case, a region of the electrolyte layer 130 where the recessed part 132 is not formed is laminated in such a manner that the region is in contact with the negative electrode layer 150. Here, the electrolyte layer 130 containing a LISICON may chemically react with lithium. Such a chemical reaction damages the electrolyte layer 130 and causes the battery function to be lost.

Therefore, a coating material that reduces such a chemical reaction may be further provided between the electrolyte layer 130 and the negative electrode layer 150. The coating material may be any material capable of reducing the chemical reaction between the electrolyte layer 130 and the negative electrode layer 150. The electrolyte layer 130 may include lithium phosphate ($LiPO_4$), a solder resist, a photoresist or the like as a coating material at least at the interface with the negative electrode layer 150, for example.

The present invention is explained on the basis of the exemplary embodiments. The technical scope of the present invention is not limited to the scope explained in the above embodiments and it is possible to make various changes and modifications within the scope of the invention. For example, the specific embodiments of the distribution and integration of the apparatus are not limited to the above embodiments, all or part thereof, can be configured with any unit which is functionally or physically dispersed or integrated. Further, new exemplary embodiments generated by arbitrary combinations of them are included in the exemplary embodiments of the present invention. The effect of the new embodiment caused by the combination has the effect of the original embodiment together.

What is claimed is:

1. A lithium battery comprising:
   a substrate;
   a positive electrode material layer formed on one surface of the substrate;
   a solid electrolyte layer formed on the surface of the positive electrode material layer opposite to the surface facing the substrate;
   a buffer layer, which is formed on the surface of the solid electrolyte layer opposite to the surface facing the substrate and is a gel-like layer including a material in which an alumina aerogel is added to an electrolytic solution or an ionic liquid; and
   a negative electrode layer that contains metallic lithium and is formed on the surface of the buffer layer opposite to the surface facing the substrate, wherein
   the solid electrolyte layer has a recessed part formed of a bathtub shape that is recessed toward the substrate on a region excluding edges of the surface facing the negative electrode layer, the recessed part including a bottom part having a flat surface, and the surface facing the negative electrode layer of the edges contact the negative electrode layer; and
   the buffer layer is formed in such a manner that the buffer layer fills the recessed part.

2. The lithium battery according to claim 1, wherein the solid electrolyte layer includes a plurality of the recessed parts in a portion of the surface facing the negative electrode layer, wherein
   the buffer layer is formed such that the buffer layer fills the plurality of the recessed parts.

3. The lithium battery according to claim 1, wherein the positive electrode material layer and the solid electrolyte layer have LAGP (Lithium Aluminum Germanium Phosphate) that is finely grained to a size of 5 μm or less.

4. The lithium battery according to claim 1, wherein the positive electrode material layer and the solid electrolyte layer have a Lithium Super Ionic Conductor (LISICON) that is finely grained to a size of 5 μm or less, wherein
   the solid electrolyte layer includes a coating material at least at an interface with the negative electrode layer.

5. The lithium battery according to claim 1, wherein a coating material including at least one of lithium phosphate ($LiPO_4$), a solder resist, and a photoresist is further provided between the solid electrolyte layer and the negative electrode layer.

* * * * *